United States Patent
Honeck et al.

(10) Patent No.: US 11,975,929 B2
(45) Date of Patent: *May 7, 2024

(54) GRAIN SPREADER FOR LOADING GRAIN BIN

(71) Applicant: Extron Company, Minneapolis, MN (US)

(72) Inventors: Randall G. Honeck, Maple Grove, MN (US); Dustin D. Paloranta, Brooklyn Park, MN (US); Greggory C. Phelps, Plymouth, MN (US)

(73) Assignee: EXTRON COMPANY, Minneapolis, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/161,158

(22) Filed: Jan. 30, 2023

(65) Prior Publication Data

US 2023/0242355 A1    Aug. 3, 2023

Related U.S. Application Data

(63) Continuation of application No. 17/117,499, filed on Dec. 10, 2020, now Pat. No. 11,577,922, which is a continuation of application No. 15/926,300, filed on Mar. 20, 2018, now Pat. No. 10,894,677.

(51) Int. Cl.
*B65G 69/04* (2006.01)
*B65G 65/32* (2006.01)

(52) U.S. Cl.
CPC ......... *B65G 69/0441* (2013.01); *B65G 65/32* (2013.01); *B65G 2814/027* (2013.01)

(58) Field of Classification Search
CPC ............... B65G 65/32; B65G 69/0441; B65G 69/0458; B65G 2814/027; B65G 2814/0282
USPC .................................................. 414/299, 301
See application file for complete search history.

(56) References Cited

U.S. PATENT DOCUMENTS

| | | | | |
|---|---|---|---|---|
| 655,552 A * | 8/1900 | Gorton | ....................... | C21B 7/20 414/206 |
| 3,232,458 A * | 2/1966 | Freeman | ............ | B65G 69/0466 198/642 |
| 3,682,394 A * | 8/1972 | Shivvers | ................ | B65G 69/00 239/665 |
| 3,966,124 A * | 6/1976 | Sukup | .................... | A01F 25/186 239/666 |
| 3,989,194 A * | 11/1976 | Parker | ................ | A01D 87/0046 239/666 |
| 4,031,929 A * | 6/1977 | Cobb | .................. | B65G 69/0458 239/684 |
| 4,040,529 A * | 8/1977 | Wurdeman | ........ | B65G 69/0441 193/17 |

(Continued)

*Primary Examiner* — James Keenan
(74) *Attorney, Agent, or Firm* — Merchant & Gould P.C.

(57) ABSTRACT

A method and apparatus to facilitate the loading of a grain bin such that the level in the grain bin increases generally uniformly and the distribution of grain size in the grain bin is generally uniform as well. The method includes redirecting the flow of the grain from the conveyer as it flows into the grain bin. In one embodiment, the apparatus includes an adjustable leveling band for redirecting the grain uniformly to a plurality of radially extending chutes. In one embodiment, the angle of the chutes can also be easily adjusted.

14 Claims, 13 Drawing Sheets

(56) References Cited

U.S. PATENT DOCUMENTS

| | | | | |
|---|---|---|---|---|
| 4,342,532 A * | 8/1982 | Voegele | ............ | B65G 69/0441 |
| | | | | 193/2 R |
| 4,902,185 A * | 2/1990 | Dixon | ................ | B65G 69/0441 |
| | | | | 239/651 |
| 5,372,467 A * | 12/1994 | Harris | ................ | B65G 69/0458 |
| | | | | 239/681 |
| 6,729,660 B2 * | 5/2004 | Musser | ............. | B65G 69/0441 |
| | | | | 406/182 |
| 6,981,831 B2 * | 1/2006 | Lonardi | ................... | C21B 7/20 |
| | | | | 414/301 |
| 6,991,415 B1 * | 1/2006 | Anschultz | ......... | B65G 69/0441 |
| | | | | 414/299 |
| 7,861,614 B2 * | 1/2011 | Sim | .......................... | F27B 1/20 |
| | | | | 414/206 |
| 8,485,345 B2 * | 7/2013 | Klutz | ................ | B65G 69/0458 |
| | | | | 198/535 |
| 8,708,632 B2 * | 4/2014 | Toline | ................... | A01F 25/186 |
| | | | | 414/300 |
| 10,302,177 B2 * | 5/2019 | Koehler | ................. | F16H 13/10 |

* cited by examiner

… (1)

GRAIN SPREADER FOR LOADING GRAIN BIN

CROSS-REFERENCE TO RELATED APPLICATION

The present application is a continuation of U.S. patent application Ser. No. 17/117,499, filed Dec. 10, 2020, now U.S. Pat. No. 11,577,922 which is a continuation of U.S. patent application Ser. No. 15/926,300, now U.S. Pat. No. 10,894,677, filed Mar. 20, 2018, both of which are entitled GRAIN SPREADER FOR LOADING GRAIN BIN, and the contents of which are incorporated by reference herein in their entireties, as if set forth fully herein.

TECHNICAL FIELD

Grain bin filling apparatuses and related methods.

BACKGROUND

Grain bins (silos, grain elevators) are commonly used to store grain. Grain bins are typically tall cylindrical structures and include a central upper opening for loading. A screw conveyer (e.g., auger) or belt conveyer is typically used to deliver the grain to the upper opening. Directly feeding grain into the grain bin from the conveyer can cause the grain bins to be loaded in an undesirable manner. For example, one side of the grain bin can be loaded with much more grain than another side, which can cause an imbalance and stress on the structure of the grain bin. Even if the grain bin is loaded generally uniformly from a radial direction with a mound of grain along the center axis of the grain bin, the fines in the grain can be concentrated rather than distributed. The fines have a different viscosity than the larger grain structure and tend to concentrate in the center of the grain bin rather than being uniformly distributed in the grain bin along with the larger grains. It is desirable to load the grain bin in a manner that results in a generally uniform loading of the grain bin vertically and radially, and also results in an even distribution of the size of the grain in the grain bin.

SUMMARY

The present disclosure provides a method and apparatus to facilitate the loading of a grain bin such that the level in the grain bin increases generally uniformly and the distribution of grain size in the grain bin is generally uniform as well. The method includes redirecting the flow of the grain from the conveyer as it flows into the grain bin. In one embodiment, the apparatus includes an adjustable leveling band for redirecting the grain uniformly to a plurality of radially extending chutes.

DETAILED DESCRIPTION

Figure 1:
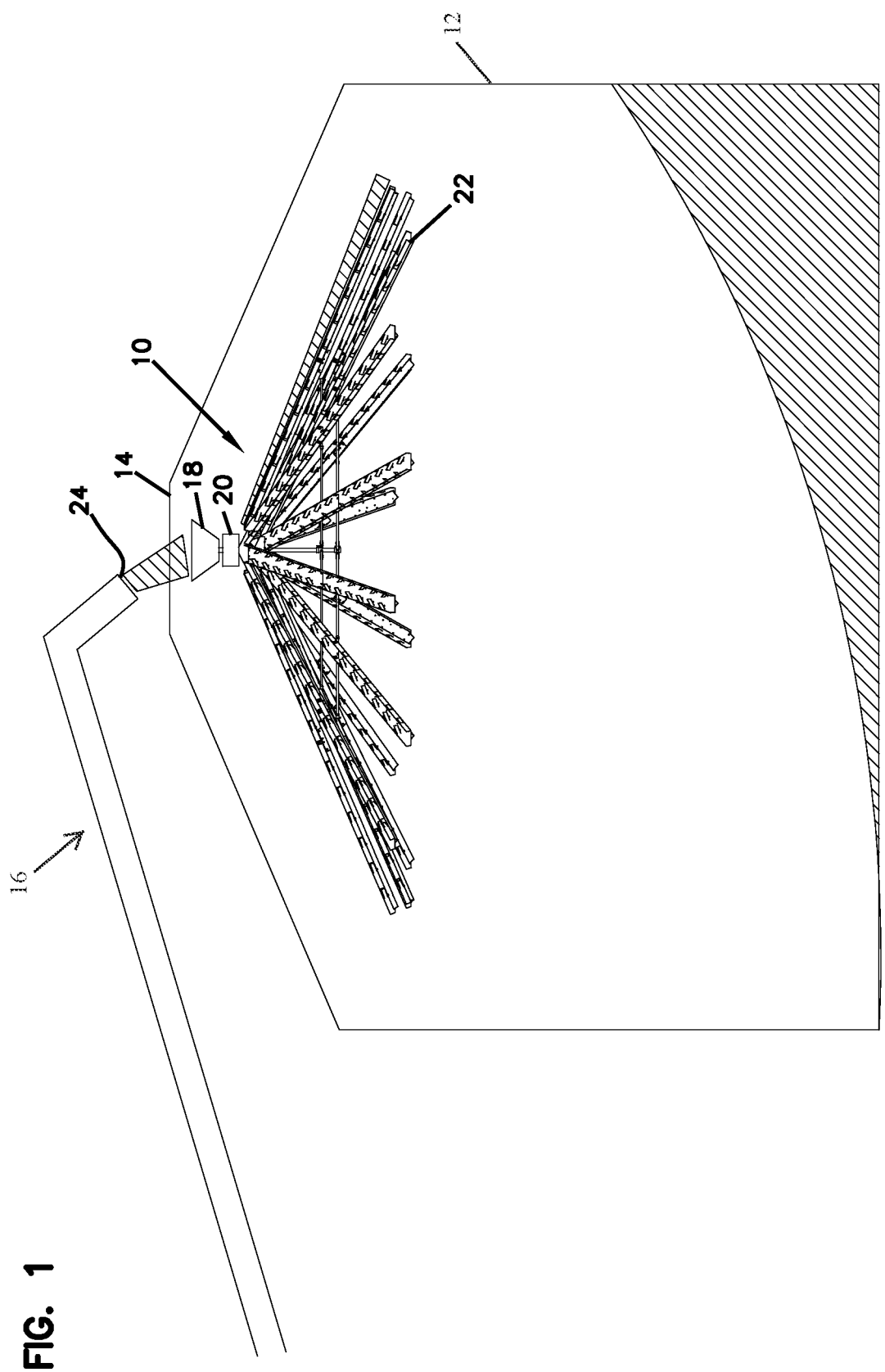
FIG. 1 depicts a grain bin loading apparatus that is not adjusted to compensate for the direction of loading.

The present disclosure provides a grain spreader 10 that can be adjusted to facilitate even and uniform loading of a grain bin 12. Typically, grain bins are loaded via a central opening 14 at the top of the grain bin 12. A conveyer 16, such as a screw auger, can be used to deliver the grain to the central opening 14. The grain typically exits the conveyer 16 at an angle relative to vertical. In other words, the grain typically does not exit the conveyer 16 in a perfectly downward direction (the flow path includes a lateral component). The grain exiting the conveyer 16 is funneled generally downwardly by a hopper 18 that directs the grain to a leveling band 20. In the depicted embodiment, the leveling band 20 is a cylindrical structure with an open top end and an open bottom end. In the depicted embodiment, the grain flow through and around the leveling band 20 is downwardly and outwardly through a plurality of downwardly and radially extending chutes 22. The chutes 22 include side openings and deflectors adjacent to the opening to direct the grain from the chute downwardly to the bottom of the grain bin 12. Unless certain accommodations are made, the loading of the grain bin 12 will generally be non-uniform because the grain entered the grain bin 12 with a lateral component (i.e., not perfectly vertically). The lateral component can depend on a number of factors, including the angle of the auger exit and the flow rate of the grain in the auger. To facilitate even and uniform loading of the grain bin 12, adjustments can be made to the grain spreader 10.

Figure 2:
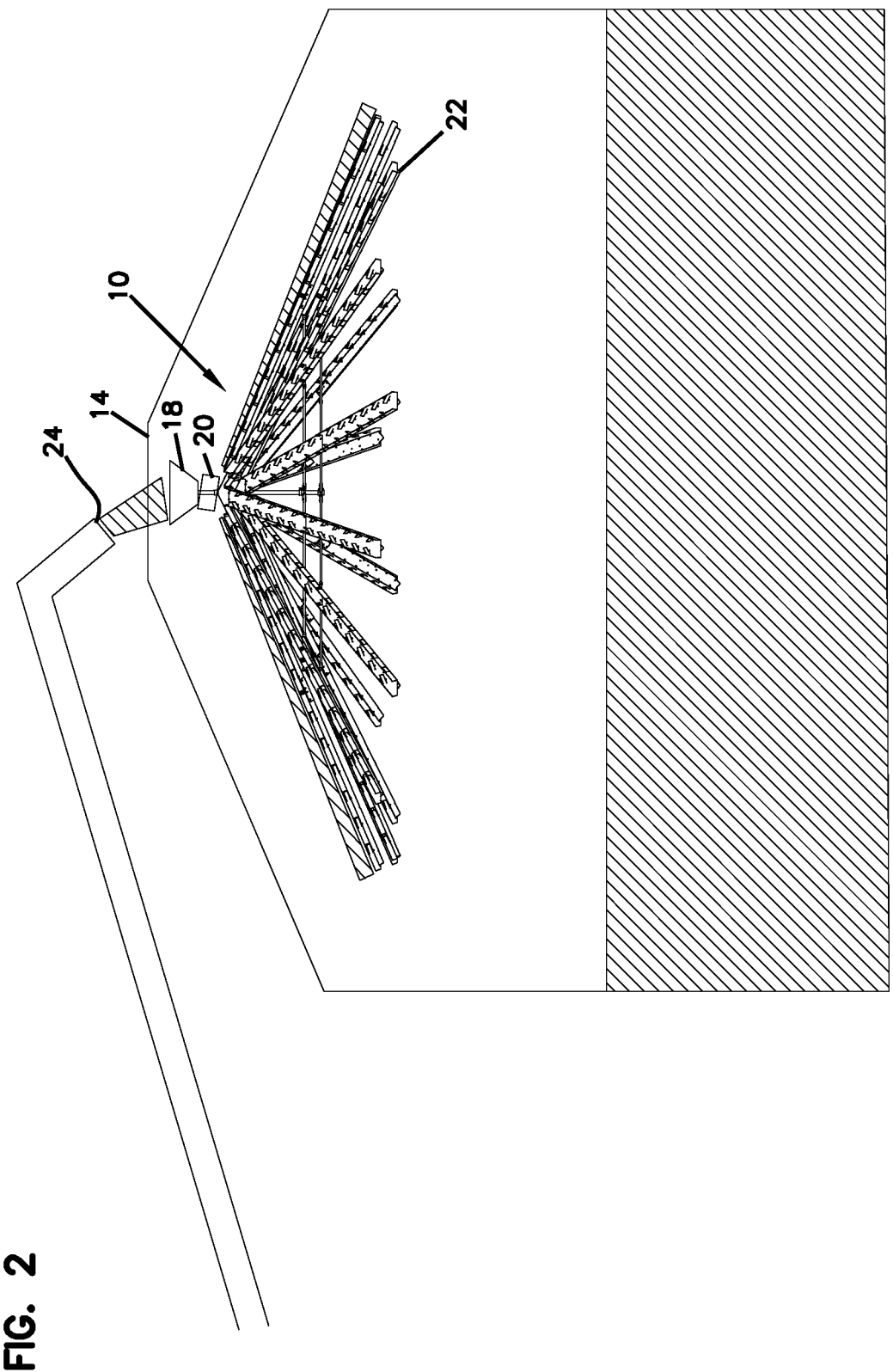
FIG. 2 depicts a grain bin loading method and apparatus that is adjusted to compensate for the direction of loading according to an embodiment of the present disclosure.
Figure 3:
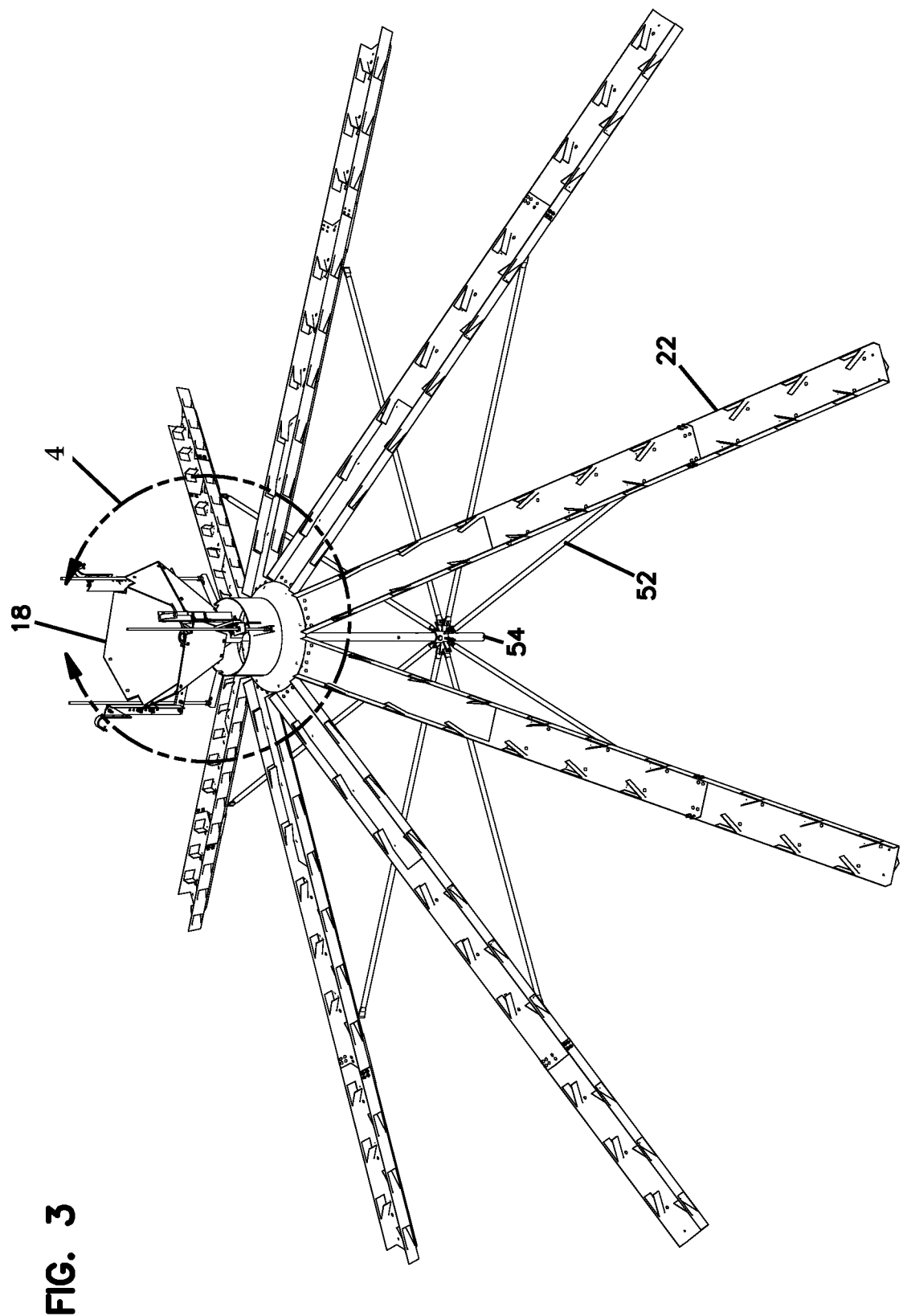
FIG. 3 is a perspective top view of an embodiment of the grain spreader of the present disclosure.
Figure 4:
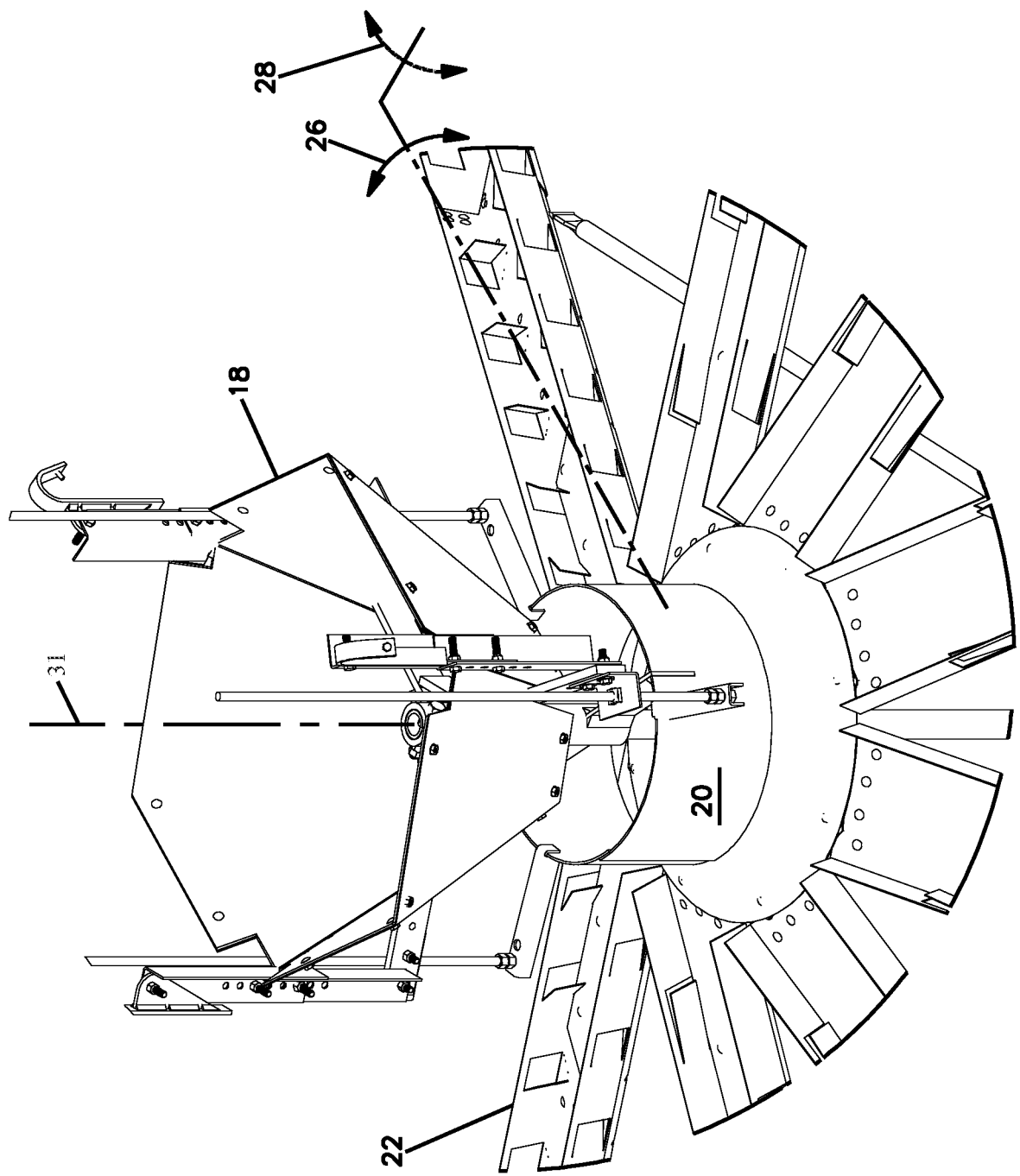
FIG. 4 is an enlarged view of a portion of FIG. 3.

Referring to FIG. 2, the leveling band 20 is canted to compensate for the direction of grain flow from the exit 24 of the conveyer 16. Referring to FIGS. 3-7, a particular embodiment of a grain spreader 10 according to one embodiment of the present disclosure is shown and described herein in further detail.

In the depicted embodiment, the leveling band 20 is configured such that it can be raised and lowered relative to the hopper 18 and chute 22 along its central axis 31. It is also configured such that its roll 26 and pitch 28 can be adjusted.

Figure 5:
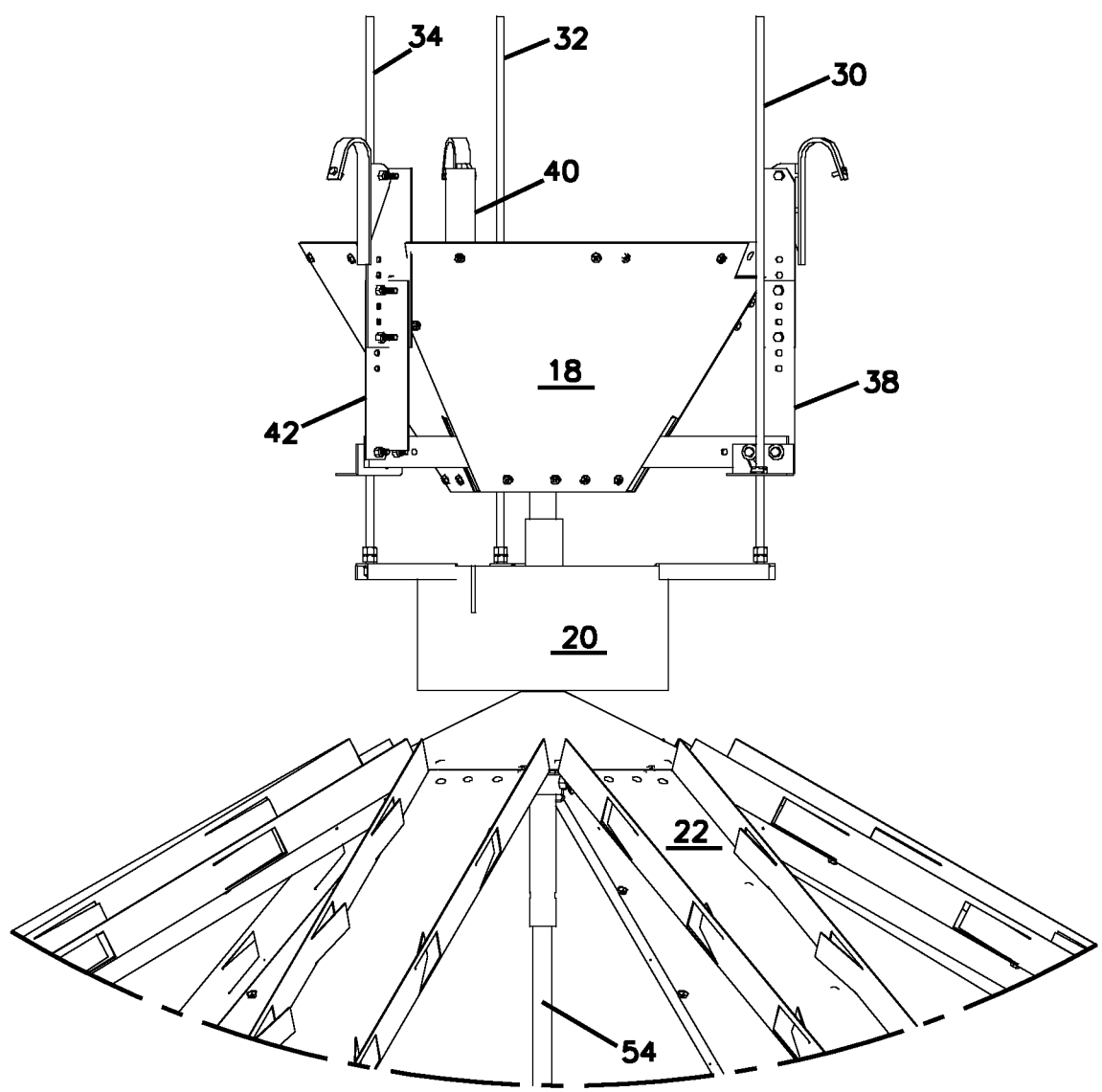
FIG. 5 is a side elevation view of the portion of the grain spreader of FIG. 3 wherein the leveling band is in a first orientation.
Figure 6:
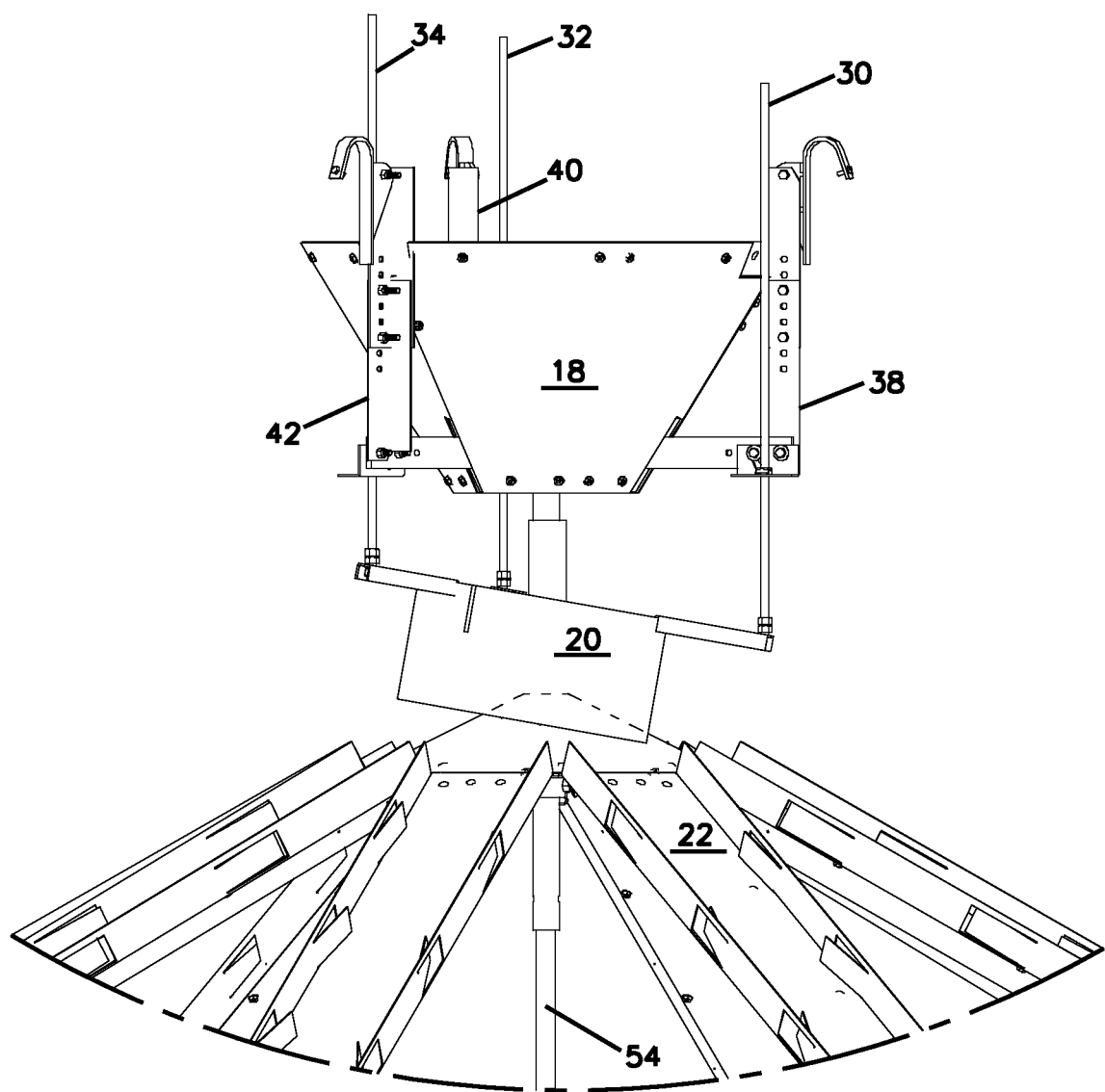
FIG. 6 is a side elevation view of the portion of the grain spreader of FIG. 3 wherein the leveling band is in a second orientation.
Figure 7:
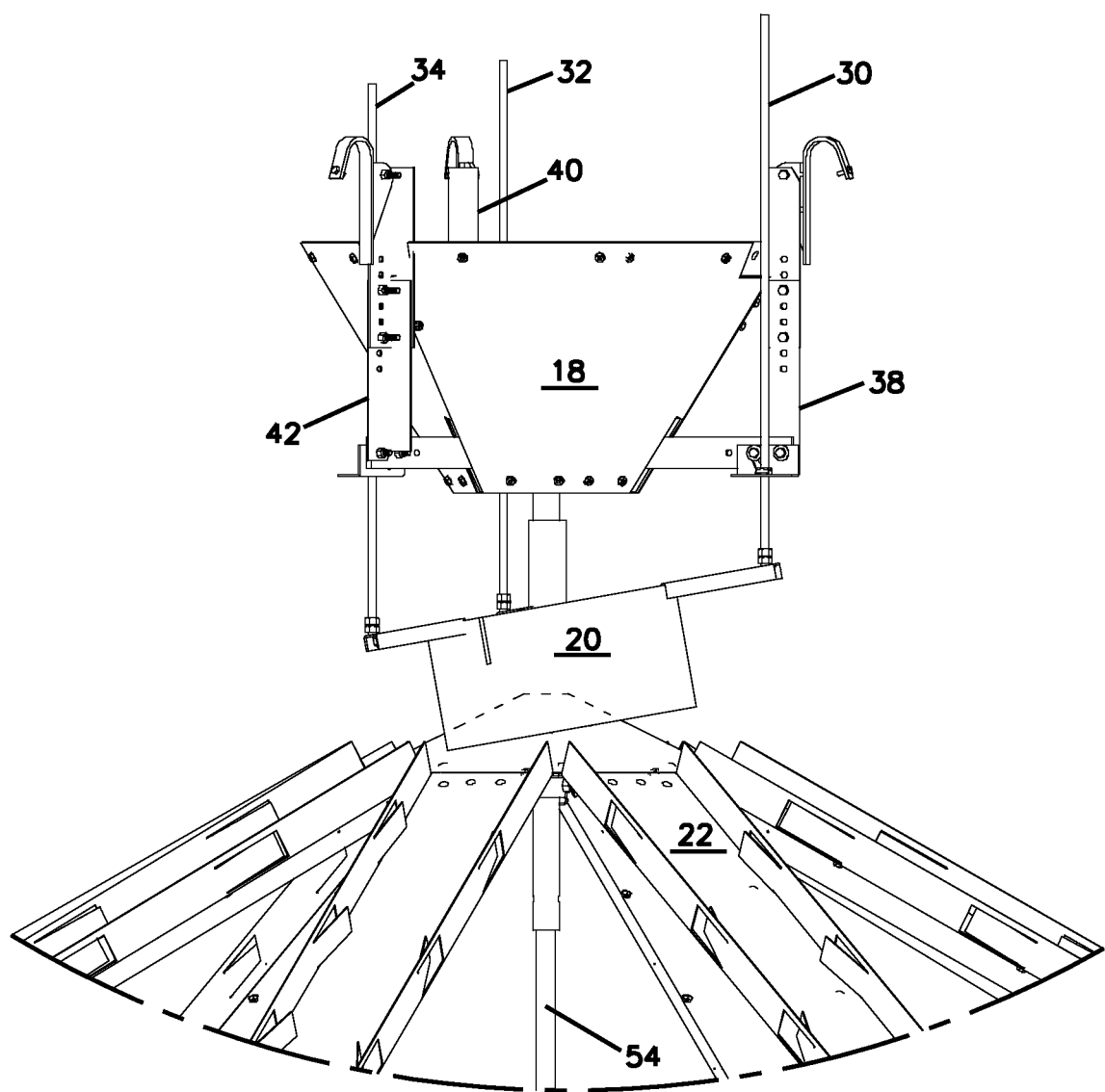
FIG. 7 is a side elevation view of the portion of the grain spreader of FIG. 3 wherein the leveling band is in a third orientation.
Figure 8:
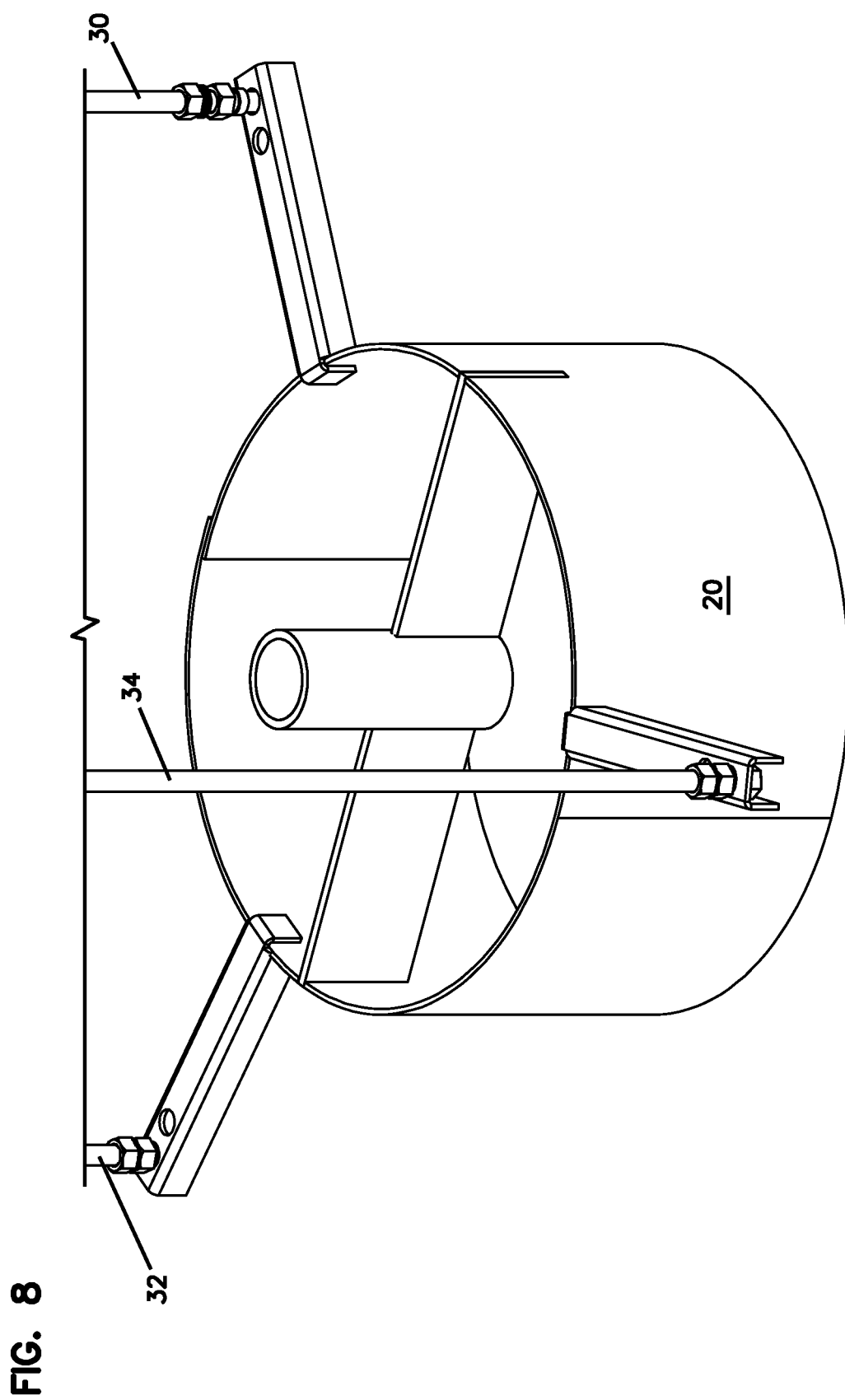
FIG. 8 is a top perspective view of a leveling band of the grain spreader of FIG. 3.
Figure 9:
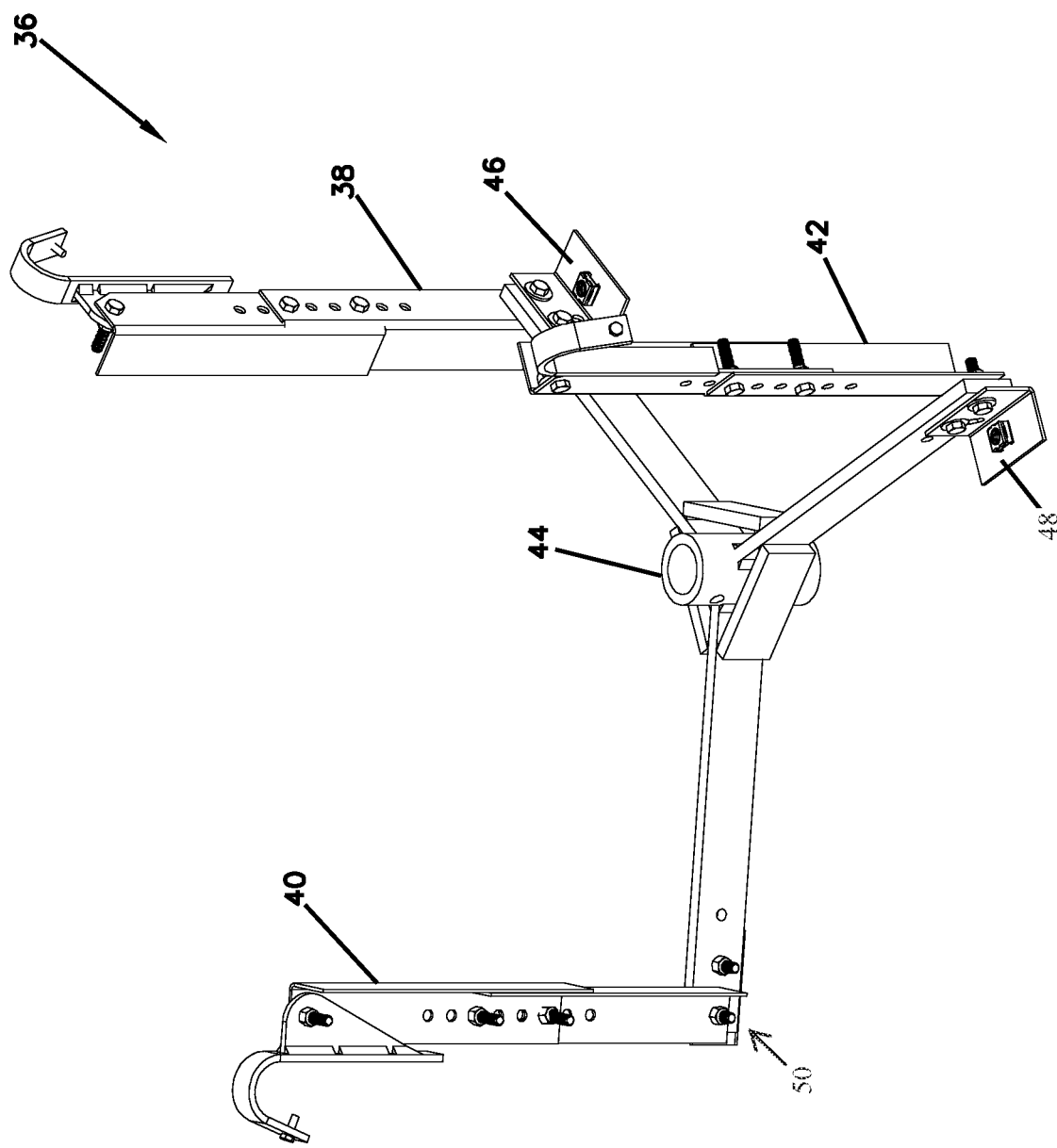
FIG. 9 is a top perspective view of a leveling band hanger assembly of the grain spreader of FIG. 3.

Referring to FIGS. 5-7, a number of orientations of the leveling band 20 is shown. In the depicted embodiment, a roll 26 and pitch 28 adjustment mechanism is configured to selectively adjust and set the roll 26 and pitch 28 orientation of the leveling band 20. In the depicted embodiment, the roll 26 and pitch 28 adjustment mechanism includes a plurality of rods (e.g., three rods 30, 32, 34) that are connected between the hopper 18 and the leveling band 20. The rods 30, 32, 34 are configured to pull and push on the leveling band 20 to change the orientation of the leveling band 20 as needed. In the depicted embodiment, each of the rods 30, 32, 34 is threaded and configured such that its effective length can be adjusted by rotating it about a longitudinal axis of the rod. In the depicted embodiment, a nut is secured to the end of the rods 30, 32, 34, which can be engaged with a hand-held driver by an operator located outside of the grain bin 12. The operator can change the roll 26 and pitch 28 (the tilt) of the leveling band 20 to adjust so that it distributes the grain onto the chutes 22 in an evenly balanced manner. In the depicted embodiment, the roll 26 and pitch 28 adjustment mechanism includes a hanger assembly 36 (FIG. 9) that threadly interfaces between the rods 30, 32, 34 that extend between the hopper 18 and the leveling band 20. In the depicted embodiment, the hanger assembly 36 includes legs 38, 40, 42 that support a centering collar 44 and a plurality of threaded interfaces 46, 48, 50. In the depicted embodiment, a first upper portion of a threaded rod 30, 32, 34 extends through the threaded interface 46, 48, 50 of the hanger assembly 36 and second lower end portions of the threaded rod 30, 32, 34 are pivotally attached to a portion of the leveling band 20. Rotation of the threaded rod 30, 32, 34 in a first direction (e.g., clockwise) extends the threaded rod 30, 32, 34 downwardly, thereby lowering the portion of the leveling band 20 connected to the second end of the threaded rod 30, 32, 34. Conversely, rotation of the threaded rod 30, 32, 34 in a second direction (e.g., counter clockwise) that is opposite to the first direction, raises the threaded rod 30, 32, 34 upwardly, thereby lifting the portion of the leveling band 20 connected to the second end of the threaded rod 30, 32, 34. In the depicted embodiment, there are three threaded rods 30, 32, 34 that extend between the hopper 18 and the leveling band 20, and they are spaced apart at 120 degrees relative to each other around the leveling band 20. In the depicted embodiment, the legs 38, 40, 42 of the hanger assembly 36 are adjustable and can be used to raise and lower the leveling band 20. However, in the depicted embodiment, the legs 38, 40, 42 are not configured to be adjusted while grain is flowing through the system. It should be appreciated that many alternative configurations are possible. For example, the rods 30, 32, 34 could be instead cables. Alternatively, the rods 30, 32, 34 could be gas or hydraulic cylinders rather than threaded. The rods 30, 32, 34 could also be telescoping pinned structures rather than threaded. In addition, alternative embodiments may not have a hanger assembly 36 or the hanger assembly 36 could be integrated with the hopper 18 as tabs that extend therefrom that engage the rods 30, 32, 34. Many other alternative configurations are also possible.

Figure 10:
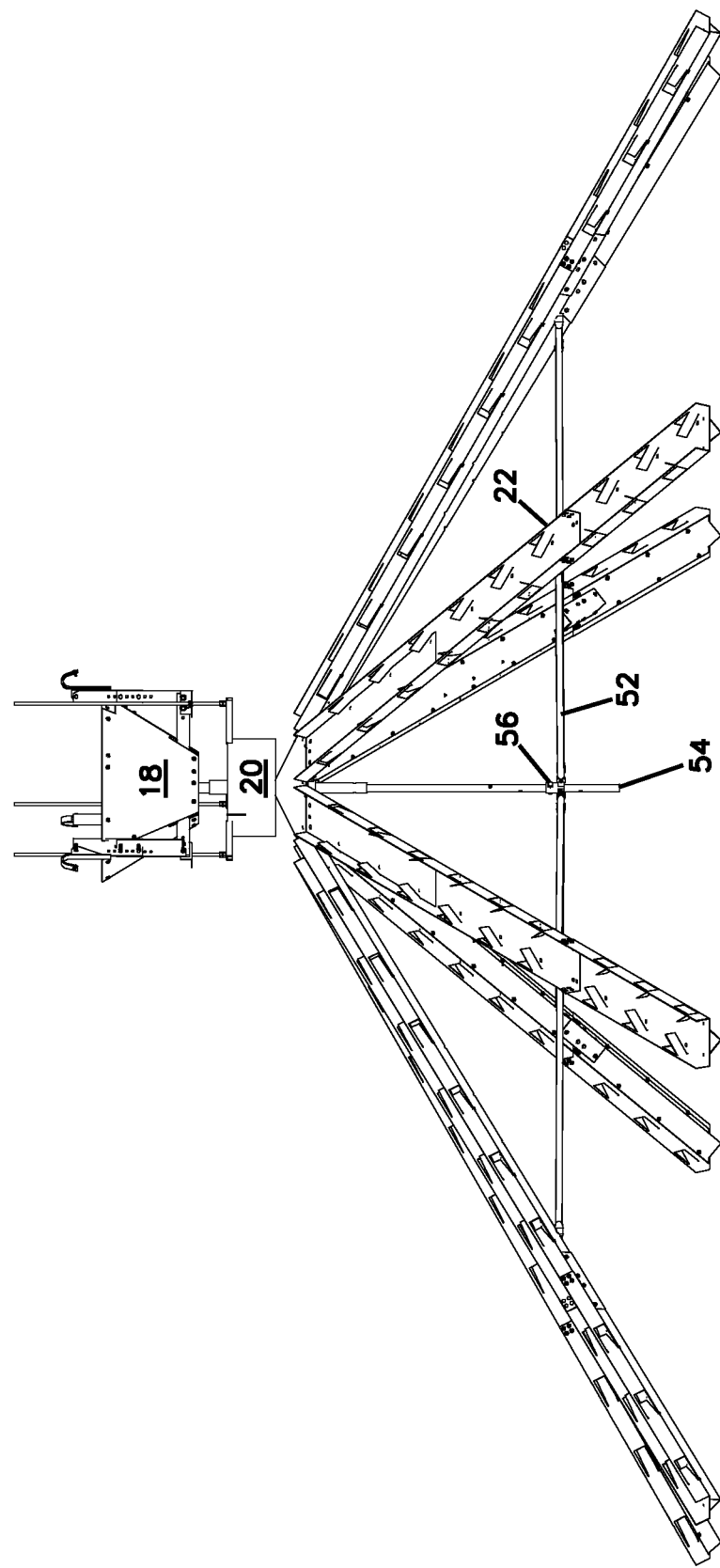
FIG. 10 is a side elevation view of the grain spreader of FIG. 3 with the chutes in a first orientation.
Figure 11:
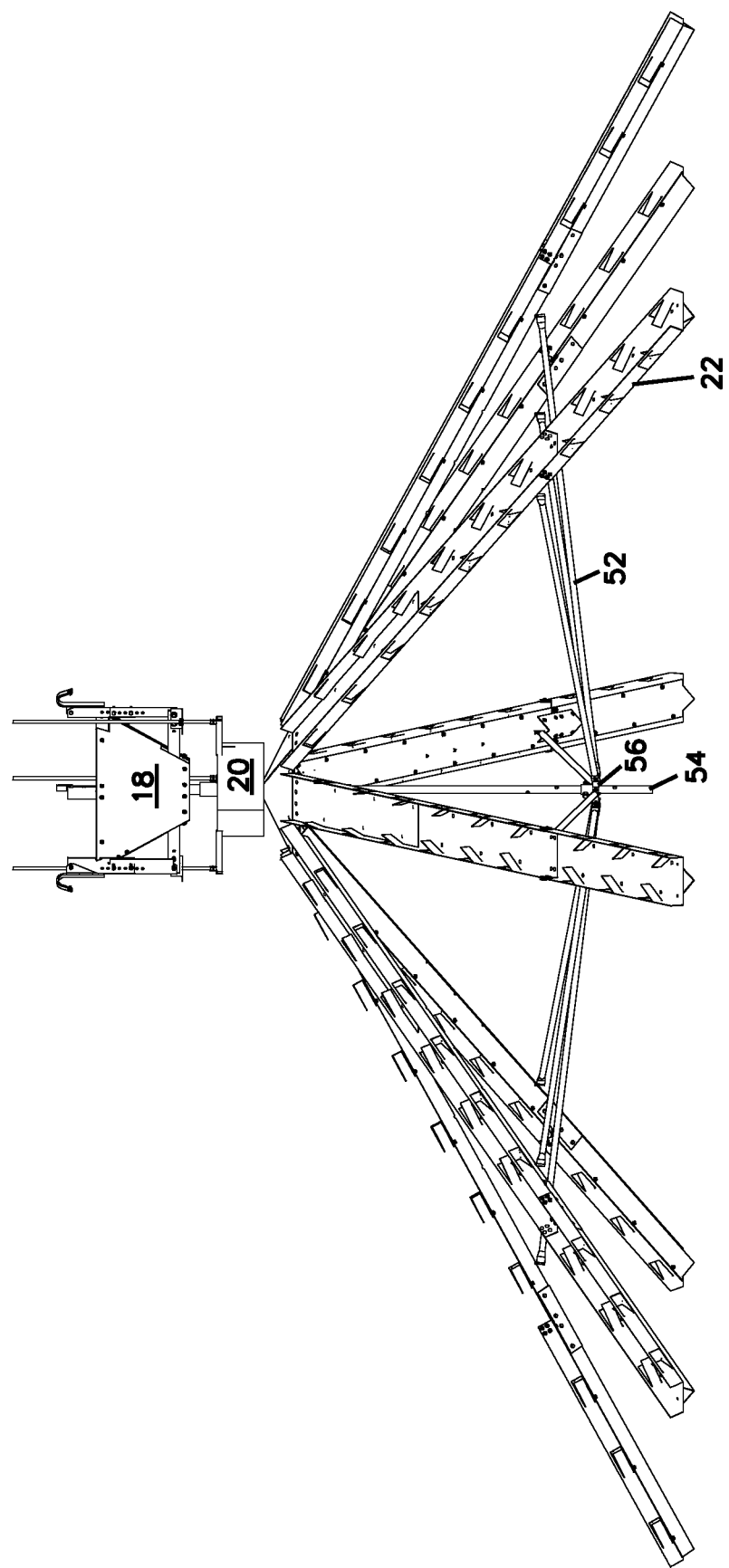
FIG. 11 is a side elevation view of the grain spreader of FIG. 3 with the chutes in a second orientation.
Figure 12:
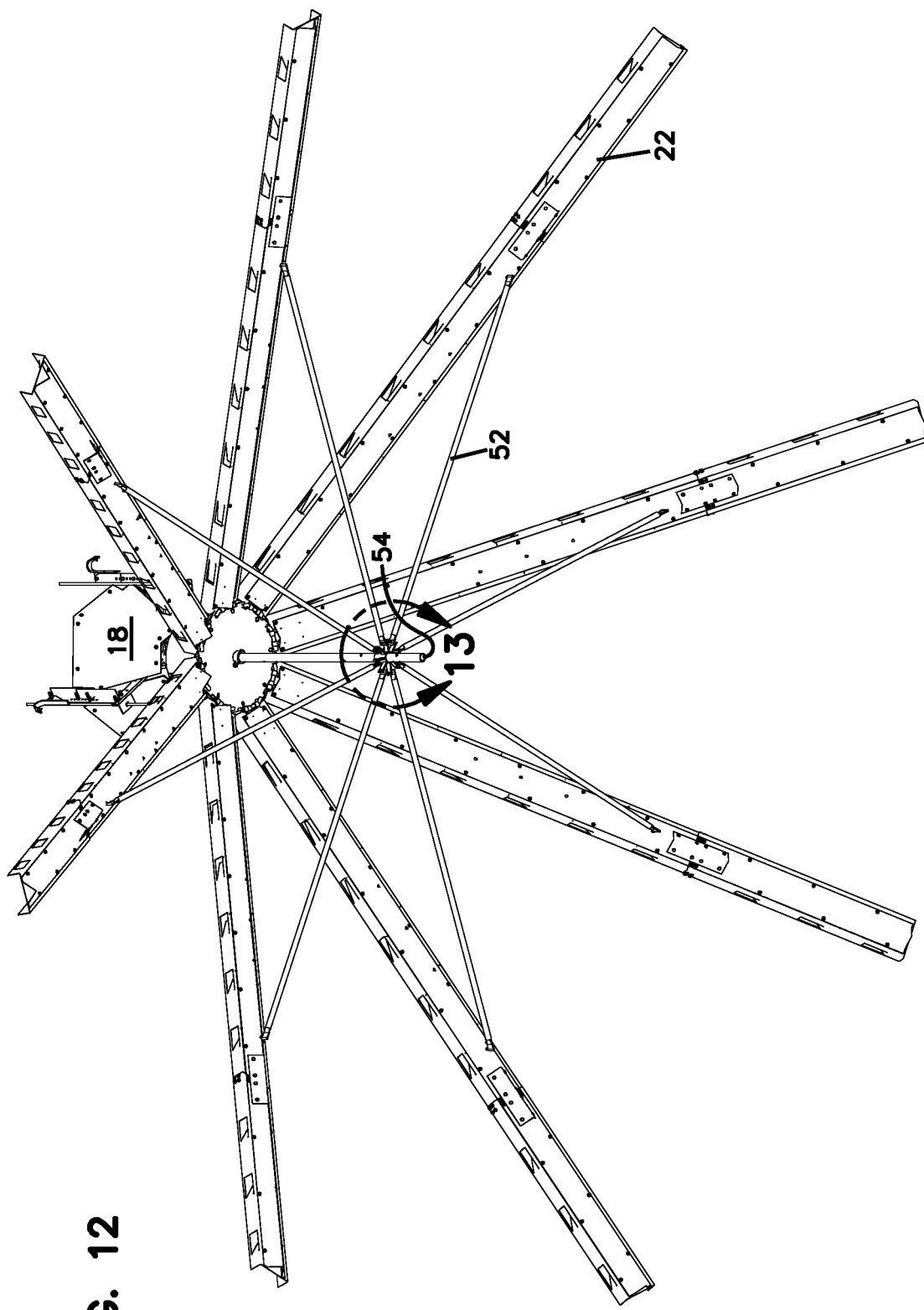
FIG. 12 is a bottom perspective view of the grain spreader of FIG. 3.
Figure 13:
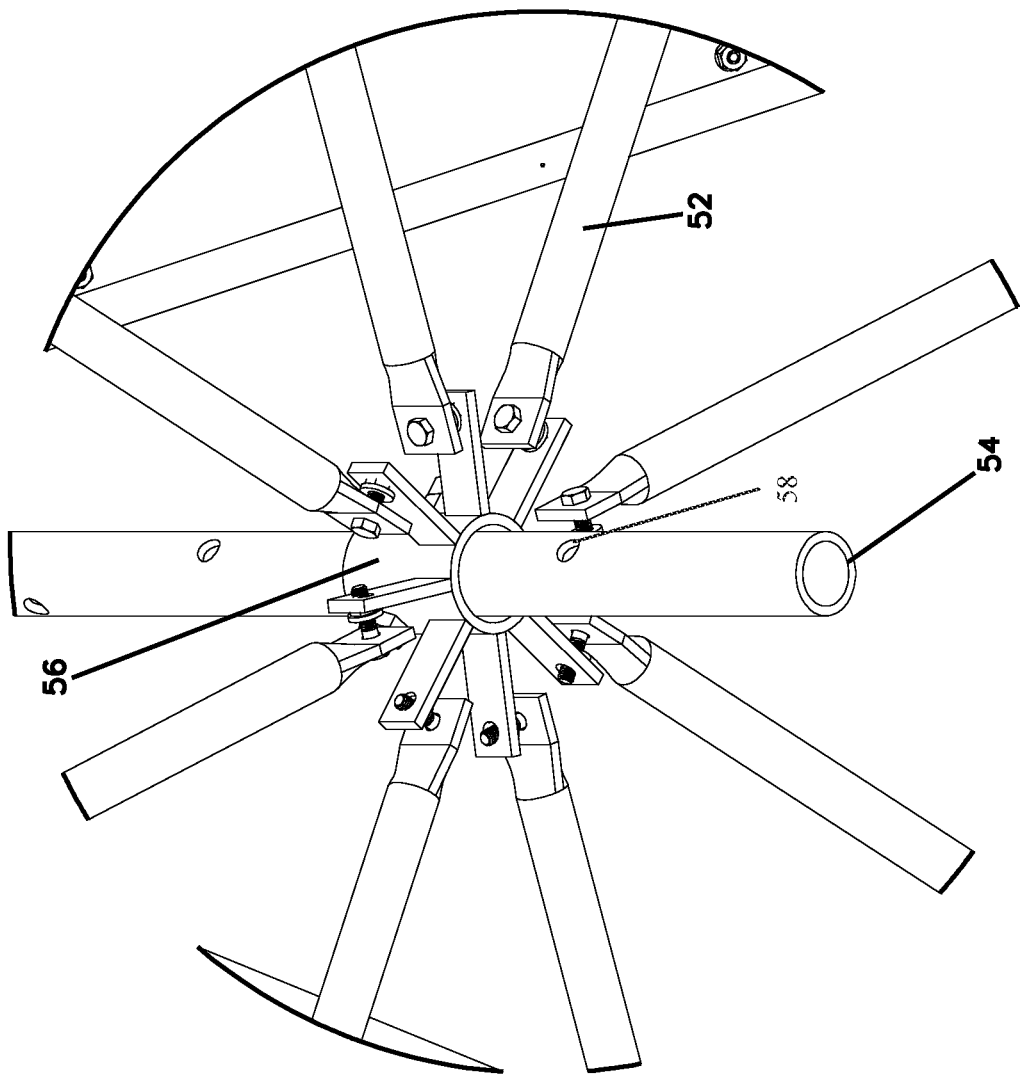
FIG. 13 is an enlarged portion of FIG. 12.

In the depicted embodiment, the plurality of downwardly and radially extending longitudinal chutes 22 distribute the grain from the leveling band 20 into a grain bin 12. Each chute 22 includes an upper first end portion and a lower second end portion. In the depicted embodiment, the upper first end portion of each chute 22 is pivotally attached below the leveling band 20. Each chute 22 is supported by a strut 52. In the depicted embodiment, each strut 52 extends from a center post 54 radially outwardly to the chute 22 that it supports. In the depicted embodiment, the grain spreader 10 includes a chute angle adjustment assembly configured to orientate the chutes 22 at a first angle (e.g., FIG. 10) relative to vertical or alternatively a second angle (e.g., FIG. 11) relative to vertical. In the depicted embodiment, the chute angle adjustment assembly is configured to change the angle of a plurality of chutes 22 simultaneously. In the depicted embodiment, each of the struts 52 includes a first end that is pivotally connected to a collar 56 that is positioned around the center post 54 and a second end that is pivotally connected to a portion of the chute 22 that it supports. The collar 56 is configured to move upwardly and downwardly along the center post 54 and be secured to the center post 54 when the desired angle of the chutes 22 is attained. In the depicted embodiment, the center post 54 includes a pin aperture 58 that is configured to receive pins that extend through the center post 54 and secures the collar 56 in place along the center post 54. It should be appreciated that many alternative configurations exist for adjusting and setting the downward angle of the chutes 22. In alternative embodiments, the collar 56 could be threaded (e.g., acme threads) on the center post 54 to raise and lower the chutes 22. Alternatively, the struts 52 themselves could be configured to extend and retract. Or the position of the connection between the struts 52 and the chutes 22 could be configured to adjust. Many other alternative configurations are also possible.

The present disclosure also provides a method of evenly distributing grain while loading a grain bin 12. The method includes the step of adjusting the tilt of a leveling band 20 to account for the direction of grain feeding into the grain bin 12. In the depicted embodiment, the step of adjusting the tilt is accomplished with the operator located primarily outside of the grain bin 12. In the depicted embodiment, the step of adjusting the tilt is accomplished with a hand-held driver that rotates a threaded rod 30, 32, 34, thereby raising and lowering a portion of the leveling band 20 causing it to tilt relative to a horizontal plane. The method further comprises the step of adjusting the downward angle of a plurality of chutes 22 located below the leveling band 20 by adjusting the position of a collar 56 that rides along a center post 54. It should be appreciated that many alternatives to the method exist. Some alternatives include more steps, others include less steps, and yet others include different steps.

It should be appreciated that many other configurations are also possible. For example, in an alternative embodiment, elastic members or springs can be used to bias the leveling band in a downward direction to provide added stability and limit float and dampen vibrations. In another embodiment, an upwardly ending center longitudinal member that extends along or parallel to the center axis of the leveling band can be used to change roll and pitch in place of cables. In other embodiments, a ball screw configuration can be used to adjust the roll and pitch of the leveling band. Many other alternative configurations are also possible.

What is claimed is:

1. An assembly, the assembly defining a vertical axis, and comprising:
   a leveling component configured to spread grain radially away from a center of the leveling component;
   a hopper positioned above the leveling component along the vertical axis and configured to direct grain into the leveling component;
   a plurality of chutes positioned below the leveling component and extending away from the leveling component radially and downwardly, the plurality of chutes being positioned to receive grain spread by the leveling component radially away from the leveling component;
   a chute angle adjustment assembly configured to adjust an angle of the plurality of chutes relative to the vertical axis;
   a plurality of elongate members coupling the leveling component to the hopper, elongate dimensions of the elongate members being oriented vertically; and
   a hanger assembly including legs coupled to and in contact with the hopper at coupling locations, the elongate members extending vertically above and vertically below the coupling locations,
wherein the legs of the hanger assembly are adjustable to vertically raise and lower the leveling component; and
wherein a height of the entire leveling component relative to the hopper is adjustable parallel to the vertical axis between an upper position of the leveling component and a lower position of the leveling component parallel to the vertical axis, tops of the elongate members being configured to move parallel to the vertical axis with the leveling component as the height of the leveling component is adjusted between the upper position and the lower position.

2. The assembly of claim 1, wherein the leveling component includes a cylindrical leveling band.

3. The assembly of claim 1, wherein the elongate members include rods.

4. The assembly of claim 1, wherein the elongate members are configured to increase in size and decrease in size parallel to the vertical axis.

5. The assembly of claim 1, wherein each elongate member is coupled to one of a plurality of structures, the structures being coupled to the leveling component and projecting radially away from the center of the leveling component.

6. The assembly of claim 5, wherein each elongate member is coupled to one of a plurality of tabs extending from the hopper.

7. The assembly of claim 1, wherein the elongate members are positioned outside an interior of the hopper.

8. The assembly of claim 1, wherein the elongate members are configured such that the elongate members do not increase in size and do not decrease in size when the elongate members move parallel to the vertical axis with the leveling component as the height of the leveling component is adjusted between the upper position and the lower position.

9. The assembly of claim 1, wherein the elongate members are coupled to the hanger assembly and extend through openings in the legs of the hanger assembly.

10. The assembly of claim 1, wherein the chute angle adjustment assembly includes struts coupled to the plurality of chutes.

11. The assembly of claim 10, wherein the struts are coupled to a center post, the struts being configured to move upwardly and downwardly along the center post.

12. The assembly of claim 10, wherein the struts are configured to extend and retract.

13. An assembly, the assembly defining a vertical axis, and comprising:
a leveling component configured to spread grain radially away from a center of the leveling component;
a hopper positioned above the leveling component along the vertical axis and configured to direct grain into the leveling component;
a plurality of chutes positioned below the leveling component and extending away from the leveling component radially and downwardly, the plurality of chutes being positioned to receive grain spread by the leveling component radially away from the leveling component;
a chute angle adjustment assembly configured to adjust an angle of the plurality of chutes relative to the vertical axis; and
a plurality of elongate members coupling the leveling component to the hopper, elongate dimensions of the elongate members being oriented vertically,
wherein a height of the entire leveling component relative to the hopper is adjustable parallel to the vertical axis between an upper position of the leveling component and a lower position of the leveling component parallel to the vertical axis, tops of the elongate members being configured to move parallel to the vertical axis with the leveling component as the height of the leveling component is adjusted between the upper position and the lower position,
wherein the elongate members extend above the top of the hopper when the leveling component is in the lower position.

14. An assembly, the assembly defining a vertical axis, and comprising:
a leveling component configured to spread grain radially away from a center of the leveling component;
a hopper positioned above the leveling component along the vertical axis and configured to direct grain into the leveling component;
a plurality of chutes positioned below the leveling component and extending away from the leveling component radially and downwardly, the plurality of chutes being positioned to receive grain spread by the leveling component radially away from the leveling component;
a chute angle adjustment assembly configured to adjust an angle of the plurality of chutes relative to the vertical axis; and
a plurality of elongate members coupling the leveling component to the hopper, elongate dimensions of the elongate members being oriented vertically,
wherein a height of the entire leveling component relative to the hopper is adjustable parallel to the vertical axis between an upper position of the leveling component and a lower position of the leveling component parallel to the vertical axis, tops of the elongate members being configured to move parallel to the vertical axis with the leveling component as the height of the leveling component is adjusted between the upper position and the lower position; and
wherein the elongate members are configured to adjust and set, without rotating the leveling band about the vertical axis:
i) a roll of the leveling band relative to the hopper about a first horizontal axis; and
ii) a pitch of the leveling band relative to the hopper about a second horizontal axis perpendicular to the first horizontal axis.

* * * * *